US010502944B2

(12) United States Patent
Putman et al.

(10) Patent No.: US 10,502,944 B2
(45) Date of Patent: Dec. 10, 2019

(54) APPARATUS AND METHOD TO REDUCE VIGNETTING IN MICROSCOPIC IMAGING

(71) Applicant: Nanotronics Imaging, Inc., Cuyahoga Falls, OH (US)

(72) Inventors: Matthew C. Putman, Brooklyn, NY (US); John B. Putman, Celebration, FL (US); Dylan Fashbaugh, Monmouth Junction, NJ (US); Roarke Horstmeyer, Palo Alto, CA (US)

(73) Assignee: Nanotronics Imaging, Inc., Cuyahoga Falls, OH (US)

( * ) Notice: Subject to any disclaimer, the term of this patent is extended or adjusted under 35 U.S.C. 154(b) by 30 days.

(21) Appl. No.: 15/752,778

(22) PCT Filed: Oct. 2, 2017

(86) PCT No.: PCT/US2017/054701
§ 371 (c)(1),
(2) Date: Feb. 14, 2018

(87) PCT Pub. No.: WO2019/070226
PCT Pub. Date: Apr. 11, 2019

(65) Prior Publication Data
US 2019/0101741 A1    Apr. 4, 2019

(51) Int. Cl.
*G02B 21/36*    (2006.01)
*G02B 21/06*    (2006.01)
(Continued)

(52) U.S. Cl.
CPC .......... *G02B 21/361* (2013.01); *G02B 21/06* (2013.01); *G02B 21/26* (2013.01); *H04N 5/3572* (2013.01)

(58) Field of Classification Search
CPC ...... G02B 21/367; G02B 21/06; G02B 21/16; G02B 21/0032; G02B 21/0076;
(Continued)

(56) References Cited

U.S. PATENT DOCUMENTS 6,081,371 A    6/2000  Shioda et al.
6,456,438 B1   9/2002  Lee et al.
(Continued)

OTHER PUBLICATIONS

Samuel J. Yang et al—Extended field-of-view and increased-signal 3D holographic illumination with time-division multiplexing—Opt Express. Dec. 14, 2015; 23(25): 32573-32581.
(Continued)

*Primary Examiner* — Farhan Mahmud
(74) *Attorney, Agent, or Firm* — Renner, Kenner, Greive, Bobak, Taylor & Weber

(57) ABSTRACT

A method for altering the intensity of light across the field of view of an image sensor in a microscope apparatus having a light source, an image sensor having pixels, and a specimen stage, wherein light from the light source travels along a light path to the specimen stage and then to the image sensor includes interposing a programmable spatial light modulator, pSLM, in the light path between the light source and the image sensor, the pSLM having a plurality of pixels; and modulating the intensity of light passing through one or more pixels of the plurality of pixels of the pSLM to produce an altered illumination landscape at the field of view of the image sensor that differs from an unaltered illumination landscape that would otherwise be produced at the image sensor. Vignetting can be specifically addressed.

17 Claims, 4 Drawing Sheets

(51) Int. Cl.
*G02B 21/26* (2006.01)
*H04N 5/357* (2011.01)

(58) Field of Classification Search
CPC ............... G02B 21/365; G02B 21/002; G01N
21/6458; G01N 2021/8825; H04N
5/2256; G06T 2207/10056
See application file for complete search history.

(56) References Cited

U.S. PATENT DOCUMENTS

| | | |
|---|---|---|
| 8,331,006 B2 | 12/2012 | Levola |
| 8,406,557 B2 | 3/2013 | Park et al. |
| 2004/0160603 A1 | 8/2004 | Reel |
| 2007/0057159 A1 | 3/2007 | Hing |
| 2016/0131885 A1 | 5/2016 | Nakayama et al. |
| 2017/0219809 A1* | 8/2017 | Wald .................... G02B 21/002 |
| 2019/0086598 A1* | 3/2019 | Futterer ............... G02B 6/0031 |

OTHER PUBLICATIONS

Christian Maurer et al—What spatial light modulators can do for optical microscopy—Laser Photonics Rev. 5, No. 1, 81-101 (2001)/ DOI 10.1002/Ipor.200900047.

* cited by examiner

APPARATUS AND METHOD TO REDUCE VIGNETTING IN MICROSCOPIC IMAGING

FIELD OF THE INVENTION

The present invention generally relates to microscopy, and more particularly to reducing vignetting in illumination in microscope imaging.

BACKGROUND OF THE INVENTION

To obtain clear images in microscopy it is critical to have an even field of illumination. However, as generally known, the field of illumination may be illuminated more brightly near the center of the specimen with the light intensity diminishing radially toward the perimeter of the illumination field. This change in lighting, known as vignetting, presents difficulty in the analysis of specimen images acquired in the field.

Unfortunately, the problem of vignetting affects almost every microscope. Vignetting is most often the result of a shadowing effect, caused by the finite width of optical elements and apertures within the illumination and imaging optical paths. It is also impacted by aberrations within each set of lenses. All of these sources of vignetting typically combine together to create a non-negligible background intensity variation across the image plane.

Attempts have been made to correct for vignetting by providing a diffuser after the illumination source and before the specimen. This diffuser may be ground glass, a Fresnel lens, or a fly's eye lens among others. Instead of altering the illumination source, an alternate method of correcting for vignetting includes applying an algorithm to an image generated with lighting suffering from vignetting to artificially correct the image to address vignetting. This method involves altering the image taken under illumination suffering from vignetting—it does not correct the vignetting itself. In both cases it is difficult to eliminate all effects of the lighting variation resulting in vignetting.

There is a need in the art for apparatus and methods to provide a more consistent intensity of illuminating light across the entire field of view of a microscope at the imaging plane.

SUMMARY OF THE INVENTION

In a first embodiment, the present invention provides a method for correcting the intensity of light across the field of view of an image sensor in a microscope apparatus to correct for the vignetting of light from a light source of the microscope apparatus, the microscope apparatus including an image sensor having pixels, and a specimen stage, wherein light from the light source travels along a light path to the specimen stage and then to the image sensor the method comprising the steps of: interposing a programmable spatial light modulator, pSLM, in the light path between the light source and the image sensor, the pSLM having a plurality of pixels; and modulating the intensity of light passing through one or more pixels of the plurality of pixels of the pSLM to produce an altered illumination landscape at the field of view of the image sensor that reduces the effects of vignetting of light that would otherwise be produced at the image sensor.

In a second embodiment, the present invention provides a method as in any of the forgoing embodiments, wherein the pSLM is selected from the group consisting of liquid crystal displays, liquid crystal on silicon, digital micro-mirror devices, and suspended particle devices.

In a third embodiment, the present invention provides a method as in any of the forgoing embodiments—wherein the altered illumination landscape has a uniformity of light intensity wherein light intensity across the field of view is within +/−5% of the average intensity across the field of view.

In a fourth embodiment, the present invention provides a method as in any of the forgoing embodiments, wherein the intensity of light passing through the one or more pixels in said step of modulating is controlled by input from a processor.

In a fifth embodiment, the present invention provides a method as in any of the forgoing embodiments, wherein, in said step of modulating the intensity of light, the processor controls the intensity of light passing through the one or more pixels of the pSLM by electrical signals to the one or more pixels.

In a sixth embodiment, the present invention provides a method as in any of the forgoing embodiments, wherein, prior to said step of modulating, the method further includes the step of: assessing a reference illumination landscape of the microscope apparatus, said step of assessing including: placing a reference specimen in the field of view of the image sensor, defining a plurality of segments of the pSLM, each segment having one or more pixels, illuminating the reference specimen with the light source at a power level P1, and separately measuring the intensity of light reaching the image sensor through each segment of the pSLM at power level P1, by separately allowing each segment to transmit light while the remaining segments block at least a portion of light.

In a seventh embodiment, the present invention provides a method as in any of the forgoing embodiments, wherein, in said step of separately allowing each segment to transmit light while the remaining segments block at least a portion of light, the segments that block at least a portion of light transmit light at the lowest intensity permitted by the pSLM.

In a eighth embodiment, the present invention provides a method as in any of the forgoing embodiments, wherein the segments defined in said step of defining a plurality of segments of the pSLM include annular segments and a center segment.

In a ninth embodiment, the present invention provides a method as in any of the forgoing embodiments, wherein said step of modulating the intensity of light passing through the pSLM includes: identifying the segment with the lowest intensity of the reference illumination landscape, herein $S_{min}$, having an intensity $IS_{min}$; and reducing the intensity of light passing through each of the pixels of the segments of the pSLM that are greater than $IS_{min}$ at power level P1 to more closely approach $IS_{min}$.

In a tenth embodiment, the present invention provides a method as in any of the forgoing embodiments, wherein said step of modulating the intensity of light passing through the pSLM includes: identifying the segment with the lowest intensity of the reference illumination landscape, herein $S_{min}$, having an intensity $IS_{min}$; and separately reducing the intensity of light reaching the image sensor through the segments of the pSLM that are greater than $IS_{min}$ at power level P1, by separately allowing each segment to transmit light while the remaining segments block at least a portion of light, and, for each such segment, incrementally increasing the absorption of the pSLM at a first incremental value until the segment exhibits and intensity of $IS_{min}$ or below, wherein, if the intensity falls below $IS_{min}$, the method further comprises incrementally decreasing the absorption of the pSLM at that segment at a second incremental value that is less than the first incremental value.

In an eleventh embodiment, the present invention provides a method as in any of the forgoing embodiments, wherein, in said step of separately reducing the intensity of light, the remaining segments that block at least a portion of light transmit light at the lowest intensity permitted by the pSLM.

In a twelfth embodiment, the present invention provides a method as in any of the forgoing embodiments, wherein said step of modulating the intensity of light passing through the pSLM includes: identifying the maximum intensity of light in the reference illumination landscape, herein $IT_{max}$, and identifying the segment with the lowest intensity of the reference illumination landscape, herein $S_{min}$, having an intensity $IS_{min}$; monitoring the intensity of $S_{min}$ while increasing the power of the light source to a power level P2 wherein the intensity of $S_{min}$ is raised to $IT_{max}$, reducing the intensity of light passing through each of the pixels of the segments of the pSLM that are greater than $IT_{max}$ at power level P2 to more closely approach $IT_{max}$ at power level P2.

In a thirteenth embodiment, the present invention provides a method as in any of the forgoing embodiments, wherein said step of modulating the intensity of light passing through the pSLM includes: identifying the maximum intensity of light in the reference illumination landscape, herein $IT_{max}$, and identifying the segment with the lowest intensity of the reference illumination landscape, herein $S_{min}$, having an intensity $IS_{min}$; monitoring the intensity of $S_{min}$ while increasing the power of the light source to a power level P2 wherein the intensity of $S_{min}$ is raised to $IT_{max}$, separately reducing the intensity of light reaching the image sensor through the segments of the pSLM that are greater than $IT_{max}$ at power level P2, by separately allowing each segment to transmit light while the remaining segments block at least a portion of light, and, for each such segment, incrementally increasing the absorption of the pSLM at a first incremental value until the segment exhibits and intensity of $IT_{max}$ or below, wherein, if the intensity falls below $IT_{max}$, the method further comprises incrementally decreasing the absorption of the pSLM at that segment at a second incremental value that is less than the first incremental value.

In a fourteenth embodiment, the present invention provides a method as in any of the forgoing embodiments, wherein, in said step of separately reducing the intensity of light, the remaining segments that block at least a portion of light transmit light at the lowest intensity permitted by the pSLM.

In a fifteenth embodiment, the present invention provides a method as in any of the forgoing embodiments, wherein the reference specimen is a reference material that provides a substantially uniform background based on reflectivity, wherein reflectivity does not vary by more than 5% across the entire field of view of the image sensor.

In a sixteenth embodiment, the present invention provides a method as in any of the forgoing embodiments, wherein the reference specimen does not present a uniform background, and the microscope is defocused to blur the reference specimen to provide a substantially uniform background based on reflectivity, wherein reflectivity does not vary by more than 5% across the entire field of view of the image sensor.

In a seventeenth embodiment, the present invention provides a method as in any of the forgoing embodiments, further comprising an alignment step prior to said step of assessing a reference illumination landscape, said alignment step being selected from:
 a. an active area defining step comprising:
  i. successively activating each pixel of the pSLM to transmit light while all other pixels block at least a portion of light,
  ii. capturing an image with the image sensor for each successively activated pixel, and
  iii. associating each pixel of the pSLM with those pixels of the image sensor that are affected by their activation; and
 b. a center alignment step comprising:
  i. activating a plurality of pixels encompassing the center of the pSLM
  ii. capturing an image with the image sensor for the activated plurality of pixels of step b.i.
  iii. comparing the affected area of the image sensor per step b.ii. with the center of the image sensor, and, if the affected area is not centered on the image sensor,
  iv. moving the pSLM in a centering direction; and
 c. a pixel alignment step comprising:
  i. rotating the pSLM so that x and y directions of the pSLM pixels are respectively aligned with x and y directions of the image sensor; and
 d. combinations thereof.

In an eighteenth embodiment, this invention provides a method for altering the intensity of light across the field of view of an image sensor in a microscope apparatus having a light source, an image sensor having pixels, and a specimen stage, wherein light from the light source travels along a light path to the specimen stage and then to the image sensor the method comprising the steps of: interposing a programmable spatial light modulator, pSLM, in the light path between the light source and the image sensor, the pSLM having a plurality of pixels; and modulating the intensity of light passing through one or more pixels of the plurality of pixels of the pSLM to produce an altered illumination landscape at the field of view of the image sensor that differs from an unaltered illumination landscape that would otherwise be produced at the image sensor.

In a nineteenth embodiment, the present invention provides a method as in any of the forgoing embodiments, wherein, in said step of modulating the intensity of light, the processor controls the intensity of light passing through the one or more pixels of the pSLM by electrical signals to the one or more pixels.

In a twentieth embodiment, the present invention provides a method as in any of the forgoing embodiments, wherein, prior to said step of modulating, the method further includes the step of: assessing a reference illumination landscape of the microscope apparatus, said step of assessing including: placing a reference specimen in the field of view of the image sensor, defining a plurality of segments of the pSLM, each segment having one or more pixels, illuminating the reference specimen with the light source at a power level P1, and separately measuring the intensity of light reaching the image sensor through each segment of the pSLM at power level P1, by separately allowing each segment to transmit light while the remaining segments block at least a portion of light.

DETAILED DESCRIPTION OF ILLUSTRATIVE EMBODIMENTS

Figure 1:
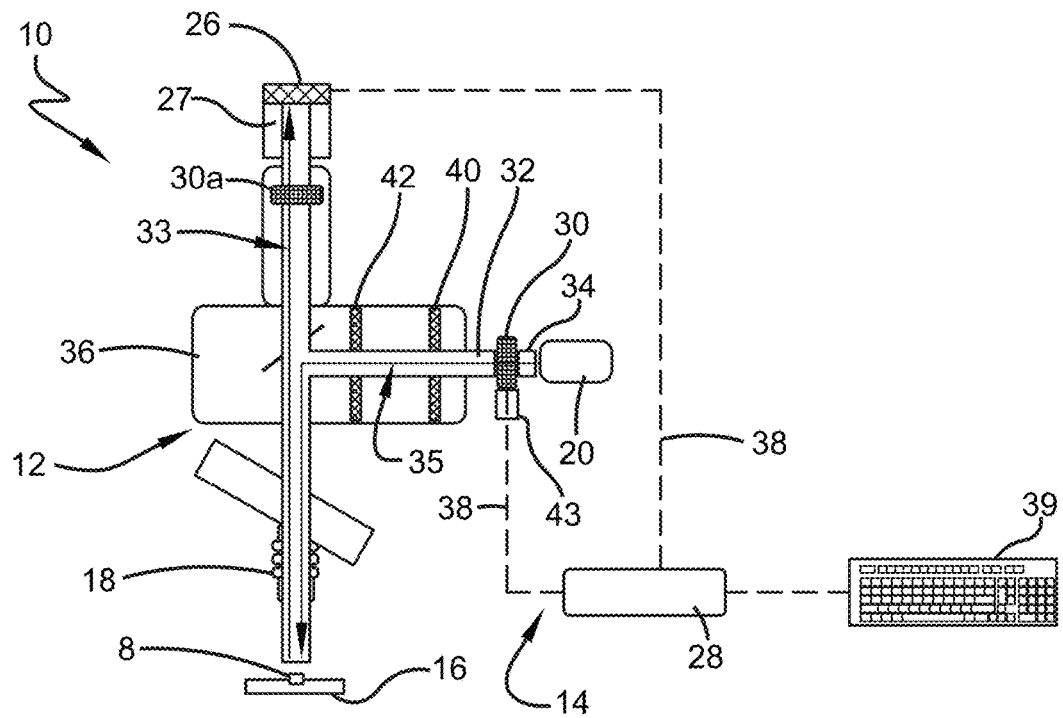
FIG. 1 is a general schematic view of a microscope apparatus in accordance with this invention.

A typical microscope system is shown in FIG. 1 and designated by the numeral 10. The microscope system 10 includes an optical system 12 for imaging a specimen, and a vignetting correction system 14 for automatically adjusting the intensity of light across the field of view as defined by the optics and imaging components of the optical system 12. This particular system 10 employs a modified reflected light microscope as the optical system 12, but it should be noted that the concepts herein disclosed readily apply to all types of microscopes, including, without limitation, transmitted light microscopes, inverted microscope and stereo microscopes. It should also be noted that the field of illumination may also be referred to as the field of view and that in practice, a specimen to be imaged is within this field.

The optical system 12 includes a specimen stage 16 carrying a specimen 8, under an objective lens 18. The optical system 12 further includes an illumination source 20 and a vertical illuminator 36 for directing the light of the illumination source 20 to illuminate the specimen 8 held in the field of view. The optical system 12 also includes an adjustable F-Stop 42 and an aperture stop 40 (A-stop). An image sensor 26 receives the image of the specimen as transmitted through the objective lens 18. The image sensor 26 may be considered as part of the vignetting correction system 14. In some embodiments, it might be provided as part of a camera 27. The vignetting correction system 14 also includes a processor 28 and a programmable spatial light modulator 30 (herein pSLM), the processor 28 communicating between the image sensor 26 and the pSLM 30 (as represented at numeral 38) to process image information provided by the image sensor 26 and alter the illumination landscape through use of the pSLM 30.

The optical path or optical train of a microscope system can be illustrated by paths 33 and 35 in FIG. 1. Path 35 is the path of the illumination beam that illuminates the sample, and, in this embodiment light is redirected, as known in reflected light microscopes, by a prism, shown but not numbered, at the diagonal line in the light path 35. Other microscopes such as transmitted light microscopes would not need such a prism. Path 33 is the path of the illumination beam that is either reflected by the sample at the sample plane as in the case of a reflected light microscope or that is transmitted through the sample at the sample plane in the case of a transmitted light microscope. Each illumination path represented by path 33 and 35 provides its own illumination landscape. The illumination landscape is to be understood as the distribution of light intensity throughout an area of illumination. The ultimate source for the illumination landscape is the illumination source, but it can be affected by various optical components, and, in accordance with this invention, the pSLM. The illumination landscape affects the image taken by image sensor 26, and it is the illumination landscape at the image sensor that is most important, as it is the image sensor that records the data necessary to image a desired specimen at the specimen stage. Thus the pSLM can be located at any location between the illumination source 20 and the image sensor 26. A pSLM located between the illumination source and a specimen at the specimen plane—that is, in path 35—serves to alter the illumination landscape delivered to the specimen (and hence the image sensor), while a pSLM located between the specimen and the image sensor—that is, in path 33—serves to alter the illumination landscape coming from the specimen to the image sensor. In either case, either undesired aspects of the illumination landscape can be corrected (e.g., vignetting) or a desired illumination landscape can be introduced. As noted above, the unaltered illumination landscape of a microscope is typically not uniform due to vignetting and other lighting irregularities resulting from various sources. In some embodiments, the pSLM will be used to even out the intensity of light to address vignetting, but in others it can be used to intentionally create a non-uniform illumination landscape.

The beam 34 represents the optical path of the light from illumination source 20 before attenuation by the pSLM 30. The beam 32 represents the optical path of the light after attenuation by pSLM 30. In some embodiments, the processor 28 and appropriate hardware can be employed to control the specimen stage 16, illumination source 20, camera 27 and other microscope components not specified herein.

In FIG. 1, and for purposes of this description, the pSLM 30 is shown externally between the illumination source 20 and the body of the vertical illuminator 36. It will be appreciated that it might alternatively be located at any location between the illumination source 20 and the image sensor 26 (as represented at alternate 30a) and is most effectively located between the illumination source 20 and the specimen S. For another example, the pSLM 30 might be placed within the vertical illuminator 36 at the position of the A-stop 40.

Programmable spatial light modulators (pSLMs) are transducers that modulate incident light in a spatial pattern, the modulation being based on electrical or optical inputs. The incident light may be modulated in its phase, intensity, polarization, or direction, and the light modulation may be achieved by a variety of materials exhibiting various electro-optic or magneto-optic effects and by materials that modulate light by surface deformation. In the present invention, the focus is on correcting for vignetting by modulating the intensity of light through a programmable spatial light modulator, the term "programmable" meaning that the pSLM can be affected by electrical or optical input to change the intensity of light passing through the pSLM at different locations across the pSLM. The input to the pSLM is based on vignetting information obtained by the image sensor 26 and processed by the processor 28, and the input serves to counter the vignetting so that a more uniform illumination is realized at the field of view. The processor 28 is broadly referred to in the singular, but should be appreciated as encompassing a plurality of processors, as well. The processor 28 can communicate with the image sensor 26 and the spatial light modulator via a cable or other appropriate means, such as wireless communication, all such communication being generally represented at numeral 38. An operator input unit, such as a keyboard, touch screen monitor or other standard means (as generally represented at numeral 39) is available for allowing an operator to input desired controls and data.

Examples of pSLMs include transmissive liquid crystal displays (LCDs), liquid crystal on silicon (LCOS), digital micro-mirror devices (DMDs), and suspended particle devices (SPDs) among others. All have the ability to modulate the amplitude and/or the phase of light at a multitude of unique spatial locations (i.e., pixels), typically in a rectangular array. In some pSLMs such as LCD, LCOS and DMDs each pixel can be addressed digitally via a connected processor, such as processor 28. In other pSLMs such as SPDs, the device is programmed as a single unit and not multiple pixels.

As known, pSLMs vary in size. Physical dimensions of pSLMs such as LCD, LCOS and DMDs may be between 1 square cm to approximately 10 square cm. The number of pixels in the pSLM, k, may vary between 2,000 to 2,000,000 or more. These sizes should not be considered limiting as many different configurations can be used in the present invention. SPD type pSLMs can be as large a multiple square meters but have only one programmable element.

The pSLMs used here include a plurality of individually addressable pixels or pixel groups, meaning that each pixel or pixel group, as the case may be, can be affected by a signal input from the processor 28 to change the intensity of light passing through at that pixel/pixel group location. The individual pixel intensity may be either variable or binary. By variable it is meant that the light transmitted through the pixel can be varied in intensity between being fully blocked and fully transmitted. By binary it is meant that the light transmitted through the pixel is either fully transmitted or fully blocked, without the ability to otherwise vary intensity between these extremes. The ability to address pixels and pixel groups of the pSLM and vary their transmission of light allows for the changing of the illumination landscape across the cross section of the light beam sent toward the field of view at the specimen stage and the image sensor, and, thus, vignetting can be corrected by delivering a higher intensity light at those spatial locations suffering from a dimming due to vignetting or by dimming those spatial locations that are of higher intensity due to vignetting.

Figure 2:
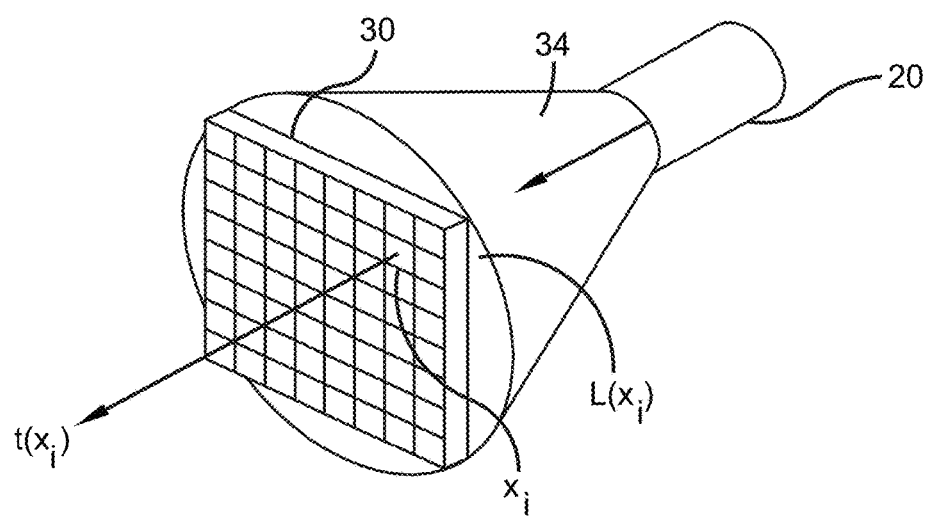
FIG. 2 is a general schematic view of a portion of a programmable spatial light modulator (pSLM)

In some embodiments, the pSLM 30 is employed as an amplitude modulator, which changes the local amplitude (i.e., intensity) of light passing through at each pixel. This is shown in FIG. 2, wherein, directly before the plane of the pSLM 30, light 34 from the illumination source 20 at pixel location $x_i$ will have an intensity denoted by $L(x_i)$. As will be more apparent after further disclosure below, where necessary, the processor is employed to manipulate the absorbance of the pSLM at various pixels, such as pixel $x_i$, through electrical input, to provide a resulting intensity denoted by $t(x_i)$. In amplitude modulation mode, the processor 28 assigns a value to the pixels at location $x_i$ such that the intensity of the light passing through the pSPM at pixel $x_i$ is attenuated by factor $g(x_i)$. The value of $g(x_i)$ is controlled by processor 28. If $g(x_i)=0$, deactivated, then the minimum amount of light is transmitted through pixel $x_i$. If $g(x_i)=1$, activated, then the maximum amount of light is transmitted though pixel $x_i$. To those familiar with the characteristics of pSLMs, it is known that at $g(x_i)=0$, some light may be transmitted through pixel $x_i$ and that at $g(x_i)=1$ some light may be attenuated at pixel $x_i$. These differences are insignificant to the application of the invention. Future use of the term activated will refer to full activation of pixels and deactivated will refer to full deactivation of pixels.

In the present method, the illumination landscape before any alteration by the pSLM is assessed by placing a reference specimen in the field of view, illuminating the reference specimen via the light source 20 and taking one or more images, T, thereof with image sensor 26 in order to obtain image data regarding the intensity of light across the landscape. In some embodiments, the power level, P, of the illumination source is first set to the illuminate the specimen at an intensity that is mid-range of the capability of the light source. In other embodiments, the intensity is set to multiple levels representing the range of intensities available from the light source. In other embodiments, the intensity is set to replicate the intensity that will be employed in the imaging of the specimen after correcting for vignetting in accordance with this invention.

The reference specimen may be a reference material that exhibits a uniform reflective background as determined by standard measurement of reflectivity. In some embodiments, a background may be considered uniform if the reflectivity does not vary by more than 5% across the entire field of view of the specimen and preferably less than 2%.

In some instances, an actual specimen without a uniform reflective background may be used. In these instances, surface irregularities and microscopic foreign objects and the like can create a non-uniform image, but defocusing can serve to blur those irregularities/foreign objects and create a more uniform image suitable for the present method.

Figure 3A:
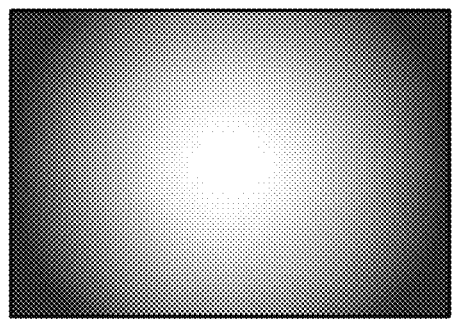
FIG. 3A is a general schematic showing radially vignetted light, as might be experiences at a sample plane of a microscope.
Figure 3B:
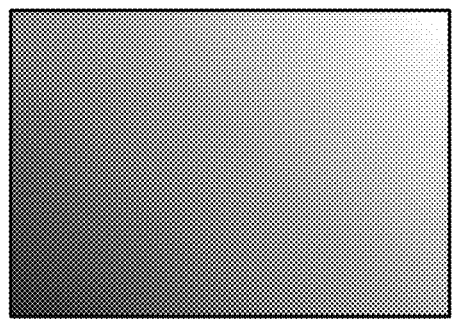
FIG. 3B is a general schematic showing off-axis vignetted light, as might be experiences at a sample plane of a microscope.
Figure 3C:
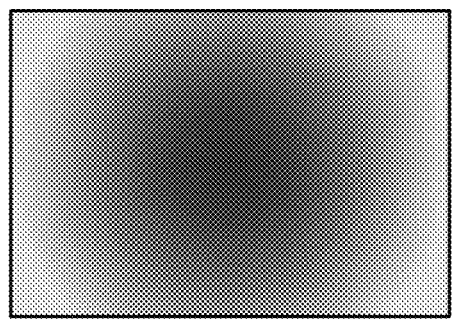
FIG. 3C is a general schematic showing the creation of a desired inverse of the radially vignetting pattern of FIG. 3A via use of a pSLM.
Figure 3D:
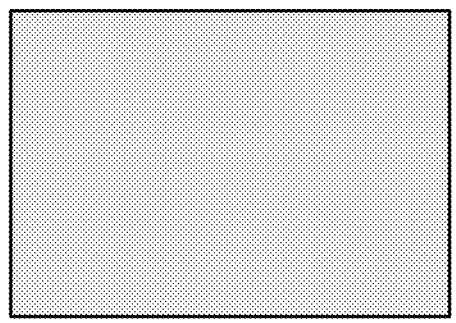
FIG. 3D shows the resultant illumination field at the sample plane when employing the pSLM with inverted vignetting pattern of FIG. 3C to modulate the light that produced the vignetting pattern of FIG. 3A.

In either case—with light incident on a reference material with uniform reflective background or with light incident on a defocused specimen with uniform background—the vignetting will be apparent, as exemplified in FIG. 3A. In some cases, the illumination may be off center as shown in FIG. 3B, and the microscope can be adjusted to bring the illumination into center as shown in FIG. 3A. This will be most useful when employing techniques based on the assumption that the dimming effects of vignetting are assumed to gradually increase along radial lines outwardly from the center of the field of view. Notably, this assumption is in accordance with general trends, when the light source illumination is on center, but it is possible for a field of illumination to have bright spots and other irregularities resulting from the lenses or illumination sources. Thus, certain embodiments herein are not based on an assumed radially-dimming pattern. The data obtained from the vignetted image or images is processed by the processor 28 to control the pSLM and used to continue the process for correcting for vignetting to create an image that is more closely uniform in light intensity as shown in FIG. 3*d*. This uniformity in light intensity is often referred to as an even or flat field of illumination. In some embodiments, a uniform image is one where every pixel of the image is within +/−20% (inclusive of 20%) of the average pixel intensity of the image. In other embodiments, a uniform image is one where every pixel of the image is within +/−10% (inclusive of 10%) of the average pixel intensity. In other embodiments, a uniform image is one where every pixel of the image is within +/−5% (inclusive of 5%) of the average pixel intensity. In yet other embodiments, the pixel intensity is within +/−2% (inclusive of 2%) of the average pixel intensity of the image. The image intensities of FIG. 3 have been exaggerated to exemplify the effect of vignetting. In practice, the extent of intensity difference is more subtle. It should be appreciated that the pSLM may also be employed to intentionally produce a non-uniform image as that may be desired or required for some imaging practices or applications. This has already be eluded to above, and, thus, this invention more generally provides methods and apparatus for altering the intensity of light (illumination landscape) across the field of view, though altering specifically to address vignetting is the focus of this exemplary disclosure.

In the present method, an appropriate input to the pSLM 30 by the processor 28 is employed to counter the vignetting effect and provide a field of illumination with a more uniform intensity at the field of view (i.e., on the specimen held at the field of view). This entails decreasing the intensity of light traveling through the pSLM at locations corresponding to areas of too high intensity at the field of view or increasing the intensity of light traveling through the pSLM at locations corresponding to areas of too low intensity at the field of view or employing a combination of these techniques.

In some embodiments, the dimming effects of vignetting are assumed to gradually increase along radial lines outwardly from the center of the field of view as seen in FIG. 3A. The pSLM is programmed to counter vignetting by restricting the light to some degree at the center of the specimen, and lessoning this restriction along concentric circles outwardly from the center. The pSLM works to restrict light to at least approximate the inverse or negative pattern of FIG. 3A, and would appear as FIG. 3C. The resultant vignette-reduced illumination at the field of view is represented in FIG. 3C. The vignetting pattern can be estimated and accounted for through numerous techniques. It should be noted that the pattern of vignetting of FIG. 3A is typical but not limiting. Uneven lighting may occur from any direction or from many directions. Embodiments of the present invention can correct for all types of uneven illumination.

A preferred first step of the invention is to align the pSLM with the image sensor 26. One method is to determine the active area of the pSLM 30. The active area is that area of the pSLM through which light passes that is directly imaged at the image sensor 26. It can be appreciated that, to be effective, the actual pSLM placed in the system should not be smaller than the beam of the illumination source. But there is no harm in the pSLM being larger than the illumination beam. As such, it is not necessary for all pixels of the pSLM to have an effect on the image captured by the image sensor 26. Although this step is not required, it facilitates application of the invention in specified embodiments.

Determining the active area may be based on precise centering of the pSLM in the optical path of the system and the known optical characteristics of the system. For example, the active area may be calculated if the optical components of the system are known and the pSLM is centered in one of the conjugate focal planes of the system.

However, the present invention does not require that the pSLM be placed in a conjugate plane and it may be necessary to experimentally determine the active area. To experimentally determine the active area, the microscope is focused on a specimen, preferable a reference specimen as previously described. Each pixel $x_i$ of the pSLM is initially deactivated. Each pixel, $x_i$, is then successively activated. As each pixel is activated, an image is captured. Before activating pixel $x_{i+1}$, pixel $x_i$ is deactivated. Activating pixels that are outside the active area of the pSLM, will have no effect on the captured image, while activating pixels within the active area of the pSLM will cause a change in the captured image. The activation of a single pixel of the pSLM may result in an intensity change of multiple image sensor pixels (a) because light spreads or (b) pixels of pSLM are larger than pixels of the image sensor or (c) pixels of the image sensor are not aligned with pixels of the pSLM, or (d) a group of pixels is activated on pSLM, thus altering multiple pixels on the image sensor. When all pSLM pixels have been sequentially activated and deactivated with images captured for each pixel activation, the pSLM pixels can be mapped to the image sensor pixels. By mapping, it is meant that each pSLM pixel $x_i$ is associated with one or more image sensor pixels $y_i$ affected upon the activation of the given pSLM pixel. More precisely, each pixel of the pSLM, when selectively activated, illuminates a set of pixels of the image sensor 26. These sets of pixels may have overlapping pixels but each set maps to a specific pSLM pixel.

The above steps in defining active pixels can be practiced by activating groups of pixels while deactivating remaining pixels. The groups of pixels would be similar to the segments disclosed with respect to FIGS. 4 and 5 (though the invention is not limited to grouping in the shapes shown therein).

Another method to align the pSLM is to adjust the pSLM so that the center most pixels of the pSLM are mapped to the center most pixels of the image sensor. Rather than programmatically mapping the pSLM pixels to the image sensor pixels, this method physically moves the pSLM in an X/Y plane parallel to the image sensor plane to achieve centering. This method requires that the pSLM be mounted such that its position may be moved in an X and Y direction. An example of this concept is generally represented by an x/y translation stage 43 shown interacting with pSLM 30 in FIG. 1. To center the pSLM, a set of pSLM pixels in the center of the pSLM are activated while all other pixels of the pSLM are deactivated. The set of activated pSLM pixels are located at or near the center of the pSLM. It is appreciated that an exact center pixel may not exist but for purposes of centering, it is acceptable in some embodiments for the center pixels of the pSLM to be +/−1 pixel off center. In some applications the center pixels of the pSLM may be +/−2 pixels off center, in other applications, +/−5 pixels, in others, +/−10 pixels, in yet others, +/−15 pixels, and, in still others the center pixels may be as much as +/−20 pixels or more off center. The required closeness to center is dependent on the total number of pSLM pixels. A single pixel in a pSLM with a small number of pixels, for example less than 500 pixels, represents a much larger area relative to the total area of the pSLM than a single pixel if a larger pSLM, for example 2 mega-pixels. Also, pSLMs with a small number of pixels generally have larger pixels than pSLMs with a large number of pixels. A single pixel, therefore, in a pSLM with smaller total number of pixels transits more light than a pSLM with a large number of pixels when activated. It may be required, therefore, for pSLMs with larger numbers of pixels to activate a larger set of "centering" pixels. The set of activated pixels may be evenly spaced in a square or circular pattern around the center pixel. The number of pixels in the set may a single pixel. In other cases the set may be 2 to 5 pixels. In other cases the number of pixels in the set may be between 5 and 10 pixels and in other cases the numbers of pixels in the set may be 10 to 100 pixels. The total number of pixels in the set may not be so large that the image sensor is totally saturated by the light transmitted through the pSLM. By saturated it is meant that every pixel of an 8 bit image sensor, for example, has an intensity value greater than 0, in some cases between 50 and 150 and in other cases than 200 but less than 256. Once the centering set of pSLM pixels is activated an image is captured and the illuminated area of the area is compared to the center of the image sensor. If the illuminated area is not centered, the pSLM in moved in an X and/or Y direction parallel to the image sensor until the illuminated area is centered.

Another alignment method is to mount the pSLM so that it can be rotated in a plane parallel to the image sensor. In this method a set of pixels of the pSLM that are in a single or multiple adjacent columns are activated so that they pass through the center pixel or near the center pixel of the pSLM. In addition to the activated columns a single or multiple adjacent rows are activated such they pass through or near the center pixels of the pSLM. The number of adjacent pixels of the activated columns and rows and the closeness to center are subject to the same conditions as described in the previously described alignment method. When the rows and columns are activated an image is captured. The pSLM orthogonal projection illuminates an orthogonal image on the sensor. This projection may or may not be parallel to the pixel rows and columns of the image sensor. If the projection is not parallel, the pSLM is rotated until the projection is parallel to the rows and the columns of the image sensor. Rotation could be achieved with an appropriate drive as represented at 44 in FIG. 1.

Other methods of mapping and alignment of the pSLM to the image sensor can be used and it can be appreciated that the three aforementioned methods may be used in combination. It can be further appreciated that the invention does not require mapping and alignment but mapping and alignment facilitate the application of the invention. The method is more fully developed below.

To implement the method of this invention, the pSLM is discretized into separately controllable segments, $S_n$. In some embodiments, the segments include only one pixel and thus the number of segments is equal to the number of pixels. In other embodiments, the number of segments, n, is generally greater than 4 (such as by separating the image sensor (e.g. CCD (charge-coupled device) and CMOS (complementary metal-oxide semiconductor)) into 4 quadrants. In other embodiments, the number of segments is greater than 9, in other embodiments, greater than 16, in other embodiments, greater than 25, and in other embodiments, greater than 36. In yet other embodiments, the number of segments is less than 400, in other embodiments, less than 225, and, in other embodiments, less than 100. Typically the number of segments can be between 16 and 25 and provide exceptional results. In other embodiments, between 26 and 100 segments are employed.

Figure 4A:
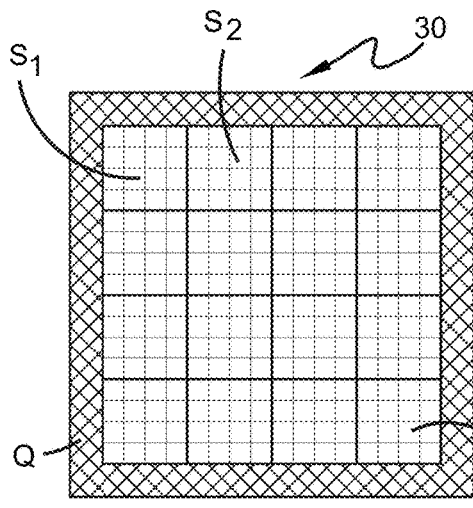
FIG. 4A is a pSLM divided into n discreet rectangular segments ($S_1$, $S_2$, . . . $S_n$) where all pixels are activated.
Figure 4B:
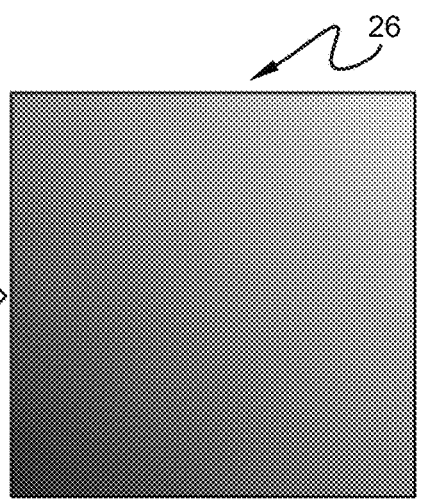
FIG. 4B is an image captured by the image sensor under the condition of the pSLM shown in FIG. 4A.
Figure 4C:
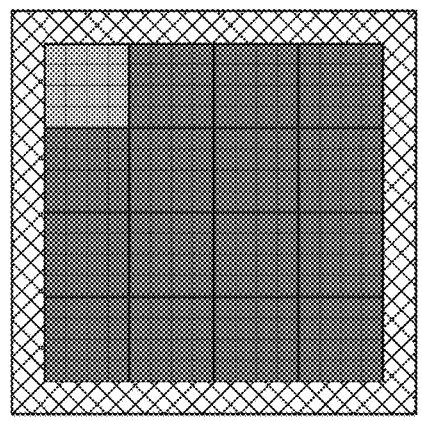
FIG. 4C is a pSLM showing segment $S_1$ activated and all other segments deactivated.

The greater the number of segments, n, the more effective the invention is at reducing the effect of vignetting. Each segment $S_n$ consists of j pixels. In some embodiments, the number of pixels in a segment is greater than 2 and less than 0.25 k where k is the total number of pixels in the active area of the image sensor 26. Each segment of the pSLM consists of a set of pixels, $PS_n$. An example of the pSLM with 16 segments, $S_n$ where n=1 to 16, is shown in FIG. 4A. For purpose of this example, the segments are shown as a square but may have different geometry in other instances.

For purposes of example and simplicity, the first described alignment method to define the active area of the pSLM is used. Therefore, the inactive area of the pSLM is shown by the crossed out pixels labelled Q in FIG. 4A. The first step of this embodiment is to assess a reference illumination landscape of the microscope apparatus so that a more desired illumination landscape can be implemented through the pSLM. This disclosure focuses on creating a more uniform illumination landscape to counter the vignetting effect as described above and illustrated, but non-uniform landscapes can be implemented with the pSLM in accordance with this invention as well. To assess the reference illumination landscape, the illumination is set at constant power of $P_1$ and image T is captured with all segments activated as in FIG. 4B. By methods known to those familiar with the art, the maximum intensity and the minimum intensity of the image T can be determined and are respectively termed $IT_{max}$ and $IT_{min}$, herein.

Figure 4D:
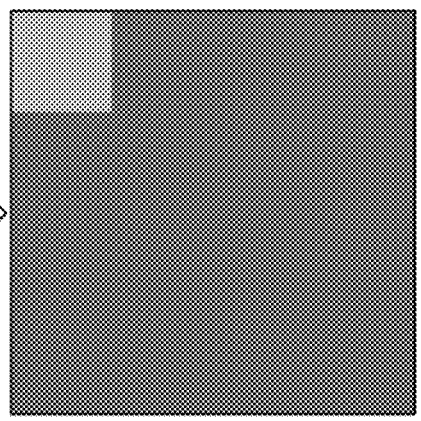
FIG. 4D is an image captured by the image sensor under the condition of the pSLM shown in FIG. 4C.
Figure 4E:
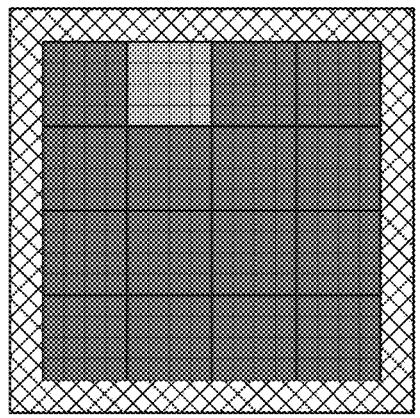
FIG. 4E is a pSLM showing segment $S_1$ activated and all other segments deactivated.
Figure 4F:
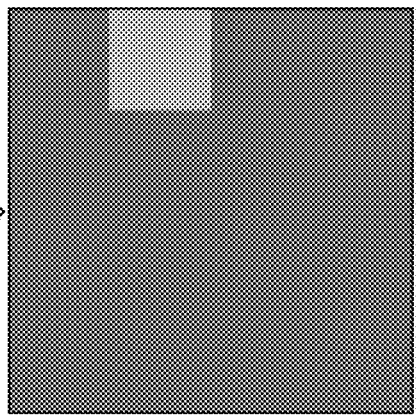
FIG. 4F is an image captured by the image sensor under the condition of the pSLM shown in FIG. 4E.

Keeping $P_1$ constant, all pixels of the pSLM are deactivated. Each segment is then activated and deactivated sequentially capturing an image at each segment activation. Examples of the captured images of the first two activation sequences, activating $S_1$ and $S_2$, are shown in FIG. 4D and FIG. 4F. In this embodiment, the deactivated segments are shown as black, i.e., with full blockage of light, but it will be appreciated that, due to characteristics of some pSLMs, it might be that some light is transmitted through a segment even upon full deactivation of that given segment. This does not affect the operation of the invention. In some embodiments, the deactivated segments block at least a portion of light, and in other embodiment, transmit light at the lowest intensity permitted by the pSLM. The average intensity value of the activated segment is calculated and recorded upon each segment activation, and the values are herein denoted $I(PS_1)$, $I(PS_2)$, ..., $I(PS_n)$. The objective of the invention is assess the intensity at the different segments and create a flat field of illumination by altering (if necessary) the intensity of light passing through the pixels in each segment, $PS_n$, so that the average intensity of this flat field of illumination will be a designated target intensity C.

To obtain C, an attenuation factor $f_n$ must be determined for each pixel of $PS_n$. This factor is used to set the attenuation value g(x) for each pixel of sets $PS_n$ such that $g(PS_n) = f_n$. Factor $f_n$ is determined by:

$$f_n = (I(PS_n) - C)/I(PS_n) \text{ where:} \qquad (1)$$

$f_n$=attenuation factor for segment, $S_n$
C=the target intensity for the flat field of illumination.
$I(PS_n)$=the Unattenuated intensity value for segment n One method of this embodiment for obtaining a flat field of illumination is achieved by a combination of changing the power of the illumination and programming the pSLM. According to the assessment of the reference illumination landscape, $IT_{max}$ is known. $IT_{max}$ could alternatively be determined by identifying the pixel segment that provides the highest intensity light during the segmenting procedure disclosed above. In this embodiment, the illumination power is increased to $P_2$ so that image intensity of the segment exhibiting the lowest intensity, $S_{min}$, is equal to $IT_{max}$. To determine $P_2$, segment $S_{min}$ is activated while all other pixels of the pSLM are deactivated. While $S_{min}$ is activated the illumination power level is incrementally increased until $I(PS_{min})=IT_{max}$. An image is captured at each incremental power level and the intensity measured. When $I(PS_{min})=IT_{max}$ the illumination power level is set to $P_2$. A flat field of illumination in this embodiment is obtained by applying an attenuation factor, $f_n$, to each pixel of each segment so that when applied, the resultant image will be a constant value, $C=IT_{max}$ at power level $P_2$.

To determine $f_n$, all pSLM segments are initially deactivated. The first segment, $S_1$, is activated and an image captured. Since the power level, $P_2$, has been set so that the intensity of the lowest intensity segment, $S_{min}=IT_{max}$, all other segments when activated will have an intensity greater than $IT_{max}$. Therefore, all segments other than $S_{min}$ can be attenuated to achieve the image intensity equal to $IT_{max}$—In this example $C=IT_{max}$. To calculate the factor $f_n$ for each segment required to achieve the intensity of $IT_{max}$, $IT_{max}$ is substituted for C in formula (1):

$$f_n=(I(PS_n)-IT_{max})/I(PS_n) \text{ where:} \quad (2)$$

$f_n$=attenuation factor for segment, $S_n$
$I(PS_n)$=the Unattenuated intensity value for segment n at power level, $P_2$ The corrected field of illumination is obtained by adjusting each pixel of each segment of the pSLM as:

$$g(p_1S_1)=f_1;g(p_2S_1)=f_1;\ldots;g(p_jS_1)=f_1$$

$$g(p_1S_2)=f_2;g(p_2S_2)=f_2;\ldots;g(p_jS_2)=f_2$$

$$g(p_1S_n)=f_n;g(p_2S_n)=f_n;\ldots;g(p_jS_n)=f_n$$

The assigning of the absorption value to each pixel of a segment will be designated: $g(PS_n)=f_n$ where $PS_n$ is each of pixels that are contained in segment $S_n$. It should be noted that each segment may contain a different number of pixels but for purpose of example herein all segments have the equal number of pixels. At pixel segments where attenuation is not necessary, i.e., those segments already transmitting at the desired target intensity C, g(x) is 1, such that the pixels of those segments transmit without any attenuation (other than any inherent attenuation resultant as a property of the pSLM itself), and, at pixel segments where attenuation is necessary, i.e., those segments transmitting at above the desired target intensity C, g(x) is set at from 0 to less than 1 to thus transmit only a certain percentage of the intensity. The processor 28 is employed to manipulate the absorbance of the pSLM at the pixels of a given segment through electrical input.

It may be necessary to repeat the segmenting steps (as per FIGS. 4C through 4E), and determine and apply attenuation factors until an acceptable improvement of the vignetting is achieved. Although in some embodiments the acceptable improvement will be based on an operator's subjective determinations, in some embodiments, an acceptable improvement will be based on providing a uniform image, based on average pixel intensity, in accordance with the disclosures above regarding a "uniform image."

Rather than calculating the factor $f_n$, it is also possible to experimentally determine $g(PS_1)$. As above, the illumination power is increased to $P_2$ until the image intensity of the segment exhibiting the lowest intensity, $S_{min}$, is equal to $IT_{max}$. The pixels of segment $S_1$ are activated while all other pixels of the pSLM are deactivated. The absorption factor $g(PS_1)$ for the set of pixels in segment $S_1$ is incrementally increased and an image captured at each incremental increase until the intensity of $IS_1=IT_{max}$. For example, starting at $g(PS_1)=0$, $g(PS_1)$ can be incrementally increased by 0.1 until $IS_1 \geq IT_{max}$. If $IS_1 > IT_{max}$ then $g(PS_1)$ is incrementally decreased by 0.01 (a relatively smaller increment) until $IS_1=IT_{max}$. This procedure is then repeated for each segment $S_n$ until all n segments are evaluated and the intensities of all segments $IS_n=IT_{max}$.

Another method of this embodiment to obtain a flat field of illumination is to keep the original illumination power level, $P_1$, and program the segments of the pSLM to be equal. In this method, all segments need to be attenuated to the segment with the minimum intensity, $IS_{min}$. In this example all segments then have an intensity $\geq IS_{min}$. A flat field of illumination in this embodiment is obtained by applying an attenuation factor, $f_n$, to each pixel of each segment so that when applied, the resultant image will be a constant value, $C=IS_{min}$ at power level $P_1$.

To determine $f_n$ at $P_1$ all pSLM segments are initially deactivated. The first segment, $S_1$, is activated and an image captured. It can be seen that the intensity for all are equal to or greater $IS_{min}$. Therefore, all segments other than those at $S_{min}$ can be attenuated to achieve the image intensity equal to $IS_{min}$. The factor for each segment required to achieve the intensity of $C=IS_{min}$ according to formula (1) is:

$$f_n=(I(PS_n)-IS_{min})/I(PS_n) \quad (3)$$

As above of the absorption value to each pixel of a segment will be designated: $g(PS_n)=f_n$ where $PS_n$ is each of the pixels that are contained in segment $S_n$.

As above, the factor $f_n$ can also be experimentally determined.

Figure 5A:
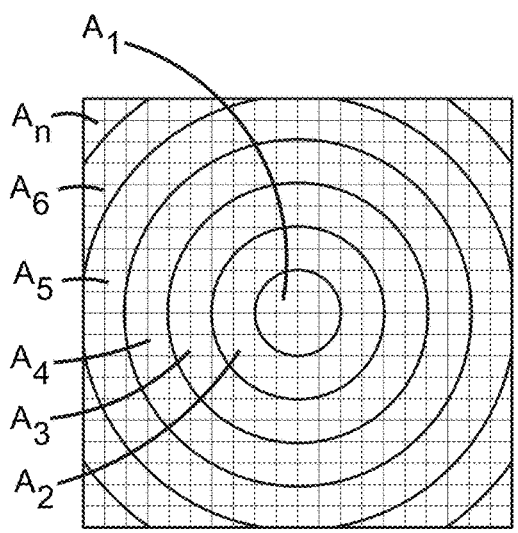
FIG. 5A is a pSLM divided into n discreet annular segments ($A_1$, $A_2$, . . . $A_n$) where all pixels are activated.
Figure 5B:
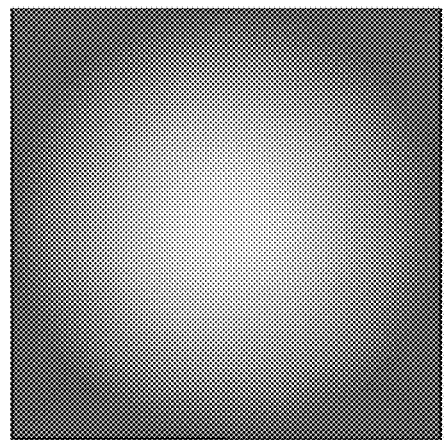
FIG. 5B is an image captured by the image sensor under the condition of the pSLM shown in FIG. 5A.
Figure 5C:
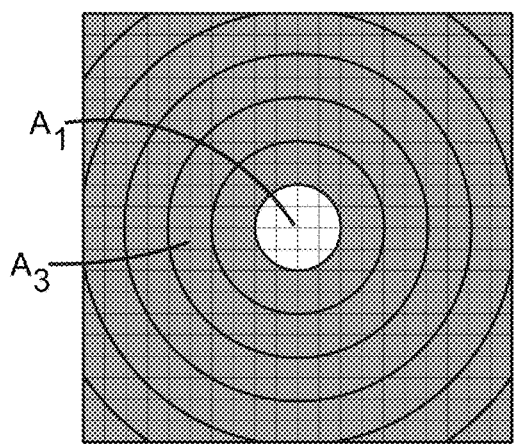
FIG. 5C is a pSLM showing segment $A_1$ activated and all other segments deactivated.
Figure 5D:
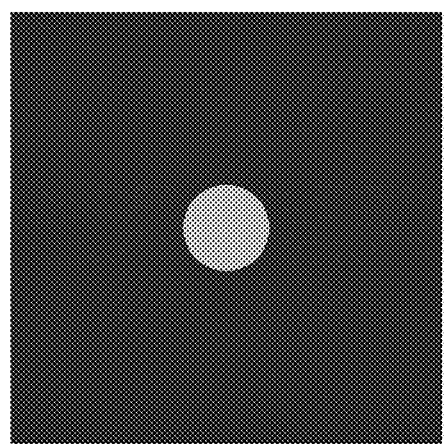
FIG. 5D is an image captured by the image sensor under the condition of the pSLM shown in FIG. 5C.
Figure 5E:
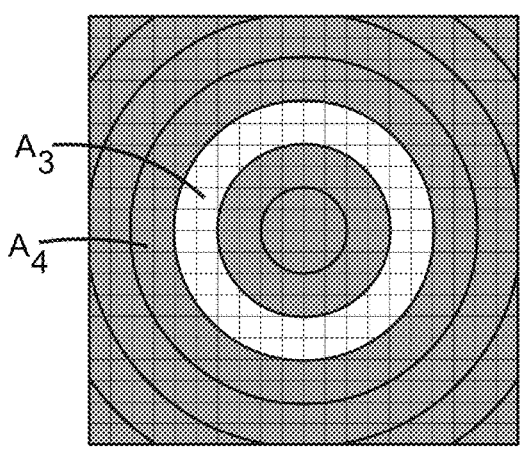
FIG. 5E is a pSLM showing segment $A_3$ activated and all other segments deactivated.
Figure 5F:
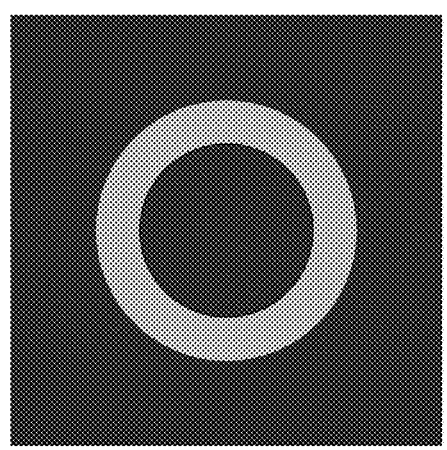
FIG. 5F is an image captured by the image sensor under the condition of the pSLM shown in FIG. 5E.

Another embodiment of the invention specifically corrects vignetting that exhibits radial vignetting as in FIG. 4A. FIG. 5A shows this vignetting with a center section ($A_1$) and discrete annular sections ($A_2$ through $A_n$). The center section and annular sections are collectively referred to as part of the annular sections $A_1$ through $A_n$, though the center section is not annular. The center section $A_1$ has a radius that can be measured in pixels. In some embodiments, the radius of the center section is 2 pixels or more, in other embodiments, 5 pixels or more, in other embodiments, 10 pixels or more, in other embodiments, 25 pixels or more, and in other embodiments, 50 pixels or more. Each annulus has an inner and outer radius, ri and ro which can be measured in pixels. The width w of an annulus is (ro−ri). In some embodiments, the number of annuli is 2 or more, in other embodiments, 5 or more, in other embodiments, 10 or more, in other embodiments 25 or more, and in other embodiments, 50 or more. In some embodiments, the width w of the annulus can be 2 pixels or more, in other embodiments, 5 pixels or more, in other embodiments, 10 pixels or more, in other embodiments, 25 pixels or more, and in other embodiments, 50 pixels or more. Optimally, the number of annuli can be a considered a function of the number of pixels k in the pSLM and the width w of the annuli. For example, if the pSLM has k pixels and 10 annuli are chosen, then each annulus is k/10 wide. The exact number annuli and the width of the annuli does not affect the general concept of this invention. It should also be noted that the width of each annulus can be different—for example, annulus A2 having a width greater than A3—but for the purpose of this example w will be the same for all annuli. As in previous embodiments the factor $f_n$ can be determined by numerous methods including those described. In FIG. 5A through 5F, perfect circles are shown to help visually appreciate the method, but it will be appreciated that the transmitted light will be pixelated according to those pixels transmitting light.

It should be noted that the described methods above use pSLMs that have continuously variable absorption values of g(x) between 0 and 1 inclusively. It was noted that some pSLMs are binary so that g(x)=0 or g(x)=1. In these cases the pixels of the segments are selectively set to g(x)=0 or g(x)=1 so that the pixel density of the segment is set to equal the absorption factor, f. The pixel density of a segment it is $$D_n = K_n/R_n \text{ where:} \quad (4)$$

$D_n$=the pixel density of the nth pSLM segment $K_n$=the number of activated pixels (i.e., g(x)=1) of the nth pSLM segment.

$R_n$=the total number of pixels of the nth pSLM segment. It can be noted that $D_n = f_n$ as previously determined. In some embodiments, the activated pixels form a pattern, preferably equally distributed throughout the segment.

These described embodiments exemplify the application of the invention but they methods are not to be considered limiting. Segments may be of any size or shape and other mathematical, statistical and experimental means may be employed to achieve the desired effect of a flat field of illumination In light of the foregoing, it should be appreciated that the present invention significantly advances the art by providing apparatus and methods for reducing vignetting in microscope imaging that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

TERMINOLOGY d the number of pixels in the image sensor.
$y_i$ the ith pixel of the image sensor.
k the number of pixels in the pSLM
$x_i$ the ith pixel of the pSLM array, $1 \le i \le k$.
I the intensity of a pixel, segment or full array of a pSLM or image sensor
$L(x_i)$ the intensity of the light before entering the ith pixel of the pSLM array.
$g(x_i)$ the attenuation value of the ith pixel of the pSLM array where $g(x_i)$ is a real number such that $0 \le g(x) \le 1$.
$t(x_i)$ the intensity of the light Transmitted through the ith pixel of the pSLM array.
n the number of discrete segments of the pSLM.
$S_n$ the nth segment of the pSLM. 1<n< the number of pixels in the pSLM.
$p_jS_n$ the jth pixel of segment $S_n$.
$PS_n$ the set of the pixels that make up segment $S_n$.
$I(PS_n)$ the average Intensity of pixels that make up the nth segment of the pSLM. The Intensity is measured on the image sensor before pSLM attenuation
$g(PS_n)$ the absorption value applied to each of the pixels that are contained in segment $S_n$ of the pSLM.
P the power level of the illumination source.
C the target intensity value of a captured imaged that represents a flat field of illumination.
$f_n$ the absorbtion value of the a multiplier of the pixels in the nth segment such that: $f_n \times IPS_n = C$.
T an image captured by the image sensor.
$IT_{max}$ the maximum intensity of image T.

$S_{min}$ the pSLM segment that exhibits the lowest intensity.
$IS_{min}$ the minimum intensity of segment $S_{min}$.
$g(PS_n)$ is the attenuated value of the nth pSLM segment.
$A_n$ the nth annular segment of the pSLM.
$D_n$ the pixel density of the nth pSLM segment.
$K_n$ the number of activated pixels of the nth pSLM segment.
$R_n$ the total number of pixels of the nth pSLM segment.

What is claimed is:

1. A method for correcting the intensity of light across the field of view of an image sensor in a microscope apparatus to correct for the vignetting of light from a light source of the microscope apparatus, the microscope apparatus including an image sensor having pixels, and a specimen stage, wherein light from the light source travels along a light path to the specimen stage and then to the image sensor the method comprising the steps of:
  interposing a programmable spatial light modulator, pSLM, in the light path between the light source and the image sensor, the pSLM having a plurality of pixels;
  modulating the intensity of light passing through one or more pixels of the plurality of pixels of the pSLM to produce an altered illumination landscape at the field of view of the image sensor that reduces the effects of vignetting of light that would otherwise be produced at the image sensor,
wherein, prior to the step of modulating, the method further includes the step of:
  assessing a reference illumination landscape of the microscope apparatus, said step of assessing including:
    placing a reference specimen in the field of view of the image sensor,
    defining a plurality of segments of the pSLM, each segment having one or more pixels,
    illuminating the reference specimen with the light source at a power level P1, and
    separately measuring the intensity of light reaching the image sensor through each segment of the pSLM at power level P1, by separately allowing each segment to transmit light while the remaining segments block at least a portion of light, and
wherein said step of modulating the intensity of light passing through the pSLM includes:
  identifying the segment with the lowest intensity of the reference illumination landscape, herein Smin, having an intensity ISmin; and
  reducing the intensity of light passing through each of the pixels of the segments of the pSLM that are greater than ISmin at power level P1 to more closely approach ISmin.

2. The method of claim 1, wherein the pSLM is selected from the group consisting of liquid crystal displays, liquid crystal on silicon, digital micro-mirror devices, and suspended particle devices.

3. The method of claim 1, wherein the altered illumination landscape has a uniformity of light intensity wherein light intensity across the field of view is within +/−5% of the average intensity across the field of view.

4. The method of claim 1, wherein the intensity of light passing through the one or more pixels in said step of modulating is controlled by input from a processor.

5. The method of claim 4, wherein, in said step of modulating the intensity of light, the processor controls the intensity of light passing through the one or more pixels of the pSLM by electrical signals to the one or more pixels.

6. The method of claim 1, wherein, in said step of separately allowing each segment to transmit light while the remaining segments block at least a portion of light, the segments that block at least a portion of light transmit light at the lowest intensity permitted by the pSLM.

7. The method of claim 1, wherein the segments defined in said step of defining a plurality of segments of the pSLM include annular segments and a center segment.

8. The method of claim 1, wherein the reference specimen is a reference material that provides a substantially uniform background based on reflectivity, wherein reflectivity does not vary by more than 5% across the entire field of view of the image sensor.

9. The method of claim 8, wherein, in said step of modulating the intensity of light, the processor controls the intensity of light passing through the one or more pixels of the pSLM by electrical signals to the one or more pixels.

10. The method of claim 8, wherein, prior to said step of modulating, the method further includes the step of:
assessing a reference illumination landscape of the microscope apparatus, said step of assessing including:
placing a reference specimen in the field of view of the image sensor,
defining a plurality of segments of the pSLM, each segment having one or more pixels,
illuminating the reference specimen with the light source at a power level $P_1$, and
separately measuring the intensity of light reaching the image sensor through each segment of the pSLM at power level $P_1$, by separately allowing each segment to transmit light while the remaining segments block at least a portion of light.

11. The method of claim 1, wherein the reference specimen does not present a uniform background, and the microscope is defocused to blur the reference specimen to provide a substantially uniform background based on reflectivity, wherein reflectivity does not vary by more than 5% across the entire field of view of the image sensor.

12. The method of claim 1, further comprising an alignment step prior to said step of assessing a reference illumination landscape, said alignment step being selected from:
a. an active area defining step comprising:
i. successively activating each pixel of the pSLM to transmit light while all other pixels block at least a portion of light,
ii. capturing an image with the image sensor for each successively activated pixel, and
iii. associating each pixel of the pSLM with those pixels of the image sensor that are affected by their activation; and
b. a center alignment step comprising:
i. activating a plurality of pixels encompassing the center of the pSLM
ii. capturing an image with the image sensor for the activated plurality of pixels of step b.i.
iii. comparing the affected area of the image sensor per step b.ii. with the center of the image sensor, and, if the affected area is not centered on the image sensor,
iv. moving the pSLM in a centering direction; and
c. a pixel alignment step comprising:
i. rotating the pSLM so that x and y directions of the pSLM pixels are respectively aligned with x and y directions of the image sensor; and
d. combinations thereof.

13. A method for correcting the intensity of light across the field of view of an image sensor in a microscope apparatus to correct for the vignetting of light from a light source of the microscope apparatus, the microscope apparatus including an image sensor having pixels, and a specimen stage, wherein light from the light source travels along a light path to the specimen stage and then to the image sensor the method comprising the steps of:
interposing a programmable spatial light modulator, pSLM, in the light path between the light source and the image sensor, the pSLM having a plurality of pixels;
modulating the intensity of light passing through one or more pixels of the plurality of pixels of the pSLM to produce an altered illumination landscape at the field of view of the image sensor that reduces the effects of vignetting of light that would otherwise be produced at the image sensor,
wherein, prior to the step of modulating, the method further includes the step of:
assessing a reference illumination landscape of the microscope apparatus, said step of assessing including:
placing a reference specimen in the field of view of the image sensor,
defining a plurality of segments of the pSLM, each segment having one or more pixels,
illuminating the reference specimen with the light source at a power level P1, and
separately measuring the intensity of light reaching the image sensor through each segment of the pSLM at power level P1, by separately allowing each segment to transmit light while the remaining segments block at least a portion of light, and
wherein said step of modulating the intensity of light passing through the pSLM includes:
identifying the segment with the lowest intensity of the reference illumination landscape, herein $S_{min}$, having an intensity $IS_{min}$; and
separately reducing the intensity of light reaching the image sensor through the segments of the pSLM that are greater than $IS_{min}$ at power level $P_1$, by separately allowing each segment to transmit light while the remaining segments block at least a portion of light, and, for each such segment, incrementally increasing the absorption of the pSLM at a first incremental value until the segment exhibits and intensity of $IS_{min}$ or below, wherein, if the intensity falls below $IS_{min}$, the method further comprises incrementally decreasing the absorption of the pSLM at that segment at a second incremental value that is less than the first incremental value.

14. The method of claim 13, wherein, in said step of separately reducing the intensity of light, the remaining segments that block at least a portion of light transmit light at the lowest intensity permitted by the pSLM.

15. A method for correcting the intensity of light across the field of view of an image sensor in a microscope apparatus to correct for the vignetting of light from a light source of the microscope apparatus, the microscope apparatus including an image sensor having pixels, and a specimen stage, wherein light from the light source travels along a light path to the specimen stage and then to the image sensor the method comprising the steps of:
interposing a programmable spatial light modulator, pSLM, in the light path between the light source and the image sensor, the pSLM having a plurality of pixels;
modulating the intensity of light passing through one or more pixels of the plurality of pixels of the pSLM to produce an altered illumination landscape at the field of view of the image sensor that reduces the effects of vignetting of light that would otherwise be produced at the image sensor, wherein, prior to the step of modulating, the method further includes the step of:
   assessing a reference illumination landscape of the microscope apparatus, said step of assessing including:
      placing a reference specimen in the field of view of the image sensor,
      defining a plurality of segments of the pSLM, each segment having one or more pixels,
      illuminating the reference specimen with the light source at a power level P1, and
      separately measuring the intensity of light reaching the image sensor through each segment of the pSLM at power level P1, by separately allowing each segment to transmit light while the remaining segments block at least a portion of light, and wherein said step of modulating the intensity of light passing through the pSLM includes:
   identifying the maximum intensity of light in the reference illumination landscape, herein $IT_{max}$; and
   identifying the segment with the lowest intensity of the reference illumination landscape, herein $S_{min}$, having an intensity $IS_{min}$;
   monitoring the intensity of $S_{min}$ while increasing the power of the light source to a power level P2 wherein the intensity of $S_{min}$ is raised to $IT_{max}$;
   reducing the intensity of light passing through each of the pixels of the segments of the pSLM that are greater than $IT_{max}$ at power level $P_2$ to more closely approach $IT_{max}$ at power level $P_2$.

16. A method for correcting the intensity of light across the field of view of an image sensor in a microscope apparatus to correct for the vignetting of light from a light source of the microscope apparatus, the microscope apparatus including an image sensor having pixels, and a specimen stage, wherein light from the light source travels along a light path to the specimen stage and then to the image sensor the method comprising the steps of:
   interposing a programmable spatial light modulator, pSLM, in the light path between the light source and the image sensor, the pSLM having a plurality of pixels;
   modulating the intensity of light passing through one or more pixels of the plurality of pixels of the pSLM to produce an altered illumination landscape at the field of view of the image sensor that reduces the effects of vignetting of light that would otherwise be produced at the image sensor, wherein, prior to the step of modulating, the method further includes the step of:
   assessing a reference illumination landscape of the microscope apparatus, said step of assessing including:
      placing a reference specimen in the field of view of the image sensor,
      defining a plurality of segments of the pSLM, each segment having one or more pixels,
      illuminating the reference specimen with the light source at a power level P1, and
      separately measuring the intensity of light reaching the image sensor through each segment of the pSLM at power level P1, by separately allowing each segment to transmit light while the remaining segments block at least a portion of light, and wherein said step of modulating the intensity of light passing through the pSLM includes:
   identifying the maximun intensity of light in the reference illumination landscape, herein $IT_{max}$; and
   identifying the segment with the lowest intensity of the reference illumination landscape, herein $S_{min}$, having an intensity $IS_{min}$;
   monitoring the intensity of $S_{min}$ while increasing the power of the light source to a power level P2 wherein the intensity of $S_{min}$ is raised to $IT_{max}$;
   separately reducing the intensity of light reaching the image sensor through the segments of the pSLM that are greater than $IT_{max}$ at power level $P_2$, by separately allowing each segment to transmit light while the remaining segments block at least a portion of light, and, for each such segment, incrementally increasing the absorption of the pSLM at a first incremental value until the segment exhibits and intensity of $IT_{max}$ or below, wherein, if the intensity falls below $IT_{max}$, the method further comprises incrementally decreasing the absorption of the pSLM at that segment at a second incremental value that is less than the first incremental value.

17. The method of claim 16, wherein, in said step of separately reducing the intensity of light, the remaining segments that block at least a portion of light transmit light at the lowest intensity permitted by the pSLM.

* * * * *